(12) United States Patent
Lavanchy et al.

(10) Patent No.: US 12,239,158 B2
(45) Date of Patent: Mar. 4, 2025

(54) AEROSOL-GENERATING ARTICLE WITH LAMINATED WRAPPER

(71) Applicant: Philip Morris Products S.A., Neuchatel (CH)

(72) Inventors: Frederic Lavanchy, Chavornay (CH); Yves Jordil, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 742 days.

(21) Appl. No.: 17/299,234

(22) PCT Filed: Dec. 4, 2019

(86) PCT No.: PCT/EP2019/083705
§ 371 (c)(1),
(2) Date: Jun. 2, 2021

(87) PCT Pub. No.: WO2020/115150
PCT Pub. Date: Jun. 11, 2020

(65) Prior Publication Data
US 2022/0039458 A1    Feb. 10, 2022

(30) Foreign Application Priority Data

Dec. 6, 2018  (EP) .................................... 18210864

(51) Int. Cl.
*A24D 1/20*  (2020.01)
*A24D 1/02*  (2006.01)
(Continued)

(52) U.S. Cl.
CPC ............... *A24D 1/20* (2020.01); *A24D 1/025* (2013.01); *A24D 3/17* (2020.01); *B32B 1/08* (2013.01);
(Continued)

(58) Field of Classification Search
CPC .. A24D 1/025; A24D 1/20; A24D 3/17; A24F 47/00
See application file for complete search history.

(56) References Cited

U.S. PATENT DOCUMENTS 5,396,911 A * 3/1995 Casey, III et al. ..... A24B 15/16
131/352
5,505,214 A    4/1996  Collins et al.
(Continued)

FOREIGN PATENT DOCUMENTS

CA    3 010 850 A1   9/2017
CN    102481021 A    5/2012
(Continued)

OTHER PUBLICATIONS

International Search Report and Written Opinion issued Feb. 28, 2020 in PCT/EP2019/083705 filed Dec. 4, 2019.
(Continued)

*Primary Examiner* — Christopher M Rodd
*Assistant Examiner* — Ronnie Kirby Jordan
(74) *Attorney, Agent, or Firm* — Oblon, McClelland, Maier & Neustadt, L.L.P.

(57) ABSTRACT

An aerosol-generating article is provided, including: an aerosol-forming substrate including plant material cut filler and between about 6 percent and about 20 percent of an aerosol-former, the plant material cut filler including at least 25 percent of plant lamina per weight of total plant material; and a laminated wrapper including a heat conductive layer and a heat insulating layer, the laminated wrapper being arranged at least partly wrapped around the aerosol-forming substrate and having a thickness of between 30 micrometers and 100 micrometers, and the heat conductive layer and the heat insulating layer overlapping along an axial direction of the aerosol-generating article.

17 Claims, 3 Drawing Sheets

(51) Int. Cl.
*A24D 3/17* (2020.01)
*B32B 1/08* (2006.01)
*B32B 7/027* (2019.01)
*B32B 15/04* (2006.01)
*B32B 15/12* (2006.01)
*B32B 15/20* (2006.01)
*D21H 19/04* (2006.01)

(52) U.S. Cl.
CPC .............. *B32B 7/027* (2019.01); *B32B 15/12* (2013.01); *B32B 15/20* (2013.01); *D21H 19/04* (2013.01); *B32B 2250/02* (2013.01); *B32B 2307/302* (2013.01); *B32B 2307/304* (2013.01); *B32B 2554/00* (2013.01)

(56) References Cited

U.S. PATENT DOCUMENTS

| | | | |
|---|---|---|---|
| 5,613,504 | A | 3/1997 | Collins et al. |
| 5,692,291 | A | 12/1997 | Deevi et al. |
| 5,730,158 | A | 3/1998 | Collins et al. |
| 5,865,185 | A | 2/1999 | Collins et al. |
| 6,129,087 | A | 10/2000 | Wallace et al. |
| 2007/0023056 | A1 | 2/2007 | Cantrell et al. |
| 2008/0092912 | A1* | 4/2008 | Robinson et al. ....... A24D 1/00 131/200 |
| 2010/0200006 | A1 | 8/2010 | Robinson et al. |
| 2012/0060853 | A1 | 3/2012 | Robinson et al. |
| 2012/0080042 | A1* | 4/2012 | Nishimura et al. ..... A24F 47/00 131/329 |
| 2015/0040930 | A1 | 2/2015 | Robinson et al. |
| 2015/0047656 | A1 | 2/2015 | Robinson et al. |
| 2015/0053219 | A1 | 2/2015 | Roudier et al. |
| 2015/0201670 | A1 | 7/2015 | Crooks et al. |
| 2016/0331031 | A1 | 11/2016 | Malgat et al. |
| 2017/0020200 | A1 | 1/2017 | Robinson et al. |
| 2018/0116275 | A1* | 5/2018 | Malgat et al. .......... A24D 1/02 |
| 2018/0142070 | A1 | 5/2018 | Reese et al. |
| 2018/0146713 | A1 | 5/2018 | Robinson et al. |
| 2018/0235285 | A1 | 8/2018 | Robinson et al. |
| 2018/0235286 | A1 | 8/2018 | Robinson et al. |
| 2019/0045844 | A1 | 2/2019 | Reevell |
| 2019/0166916 | A1 | 6/2019 | Robinson et al. |
| 2019/0166917 | A1 | 6/2019 | Robinson et al. |
| 2020/0120978 | A1 | 4/2020 | Malgat et al. |
| 2021/0127735 | A1* | 5/2021 | Bonnely et al. ......... A24D 1/22 |

FOREIGN PATENT DOCUMENTS

| | | | |
|---|---|---|---|
| CN | 103653257 | A | 3/2014 |
| CN | 104203016 | A | 12/2014 |
| CN | 103653257 | B | 12/2015 |
| CN | 106686992 | A | 5/2017 |
| CN | 108697172 | A | 10/2018 |
| EP | 3 398 460 | A1 | 11/2018 |
| JP | 2015-510399 | A | 4/2015 |
| JP | 2016-524913 | A | 8/2016 |
| JP | 2016-538863 | A | 12/2016 |
| JP | 2017-502656 | A | 1/2017 |
| JP | 2018-516565 | A | 6/2018 |
| RU | 2 524 887 | C1 | 8/2014 |
| RU | 2 639 106 | C1 | 12/2017 |
| WO | WO 2010/047389 | A1 | 4/2010 |
| WO | WO 2013/120849 | A1 | 8/2013 |
| WO | WO 2015/082648 | A1 | 6/2015 |
| WO | WO 2015/084783 | A1 | 6/2015 |
| WO | WO 2017/153467 | A1 | 9/2017 |

OTHER PUBLICATIONS

International Preliminary Report on Patentability issued Mar. 18, 2021 in PCT/EP2019/083705 filed Dec. 4, 2019.
Indian Office Action issued Feb. 16, 2022 in Indian Patent Application No. 202117023829, 6 pages.
Combined Chinese Office Action and Search Report issued Aug. 3, 2022, in corresponding Chinese Patent Application No. 201980068759.4 (with English Translation), 20 pages.
Japanese Office Action issued Feb. 13, 2023 in Japanese Patent Application No. 2021-520359 (with English Translation), 10 pages.
Extended European Search Report issued May 9, 2022, in corresponding European Patent Application No. 22156057.6, 8 pages.
Russian Search Report issued Nov. 1, 2022 in Russian Patent Application No. 2022116809 (with English translation), 4 pages.
Japanese Office Action issued May 25, 2022 in Japanese Patent Application No. 2021-620359, 3 pages.
Combined Chinese Office Action and Search Report issued Nov. 29, 2021 in Chinese Patent Application No. 2021116040 (submitting English translation only), 4 pages.

* cited by examiner

AEROSOL-GENERATING ARTICLE WITH LAMINATED WRAPPER

The present invention relates to an aerosol-generating article, to an aerosol-generating device and to a method for manufacturing an aerosol-generating article.

It is known to provide an aerosol-generating device for generating an inhalable aerosol. Such devices may heat aerosol-forming substrate contained in an aerosol-generating article without burning the aerosol-forming substrate. The aerosol-generating article may have a rod shape for insertion of the aerosol-generating article into a heating chamber of the aerosol-generating device. A heating element may be arranged in or around the heating chamber for heating the aerosol-forming substrate once the aerosol-generating article is inserted into the heating chamber of the aerosol-generating device.

While the temperature required by such a device to release relevant amounts of material to allow the formation of an acceptable aerosol is significantly lower than combustion, not all substrates are suitable to release sufficient amounts of material to form an adequate aerosol at a predetermined temperature, below combustion temperature the aerosol-forming substrate. Therefore, sophisticated aerosol-forming substrates have been developed to allow the release of material at low temperatures. Today, this is achieved by converting the tobacco leaf into artificial homogenized tobacco sheets, for example using paper making or casting processes.

However, frequently relatively high amounts of aerosol-formers are used to allow the generation of an acceptable aerosol at temperatures that are below combustion and typically, the lower the temperature, the more aerosol-former is needed. The presence of high amounts of aerosol-formers has unintended consequences, in particular staining of the wrapper of the aerosol-generating articles.

Therefore, it would be desirable to provide aerosol-generating articles that have a simple construction and that allow aerosol generation at low temperatures. Additionally, it would be desirable to provide a so-called "heat-not-burn" article that have a more natural appearance and taste.

According to a first aspect of the invention there is provided an aerosol-generating article comprising aerosol-forming substrate and a laminated wrapper. The aerosol-forming substrate comprises plant material cut filler, and wherein the plant material cut filler comprises at least 25 percent of plant lamina per weight of the total plant material and wherein the aerosol-forming substrate further comprises between about 6 percent and about 20 percent of an aerosol-former. The laminated wrapper is at least partly wrapped around the aerosol-forming substrate. The laminated wrapper comprises a heat conductive layer and a heat insulating layer. The heat conductive layer and the heat insulating layer overlap along an axial direction of the aerosol-generating article.

Advantageously, a more natural taste and appearance of the aerosol-generating article can be achieved by using natural plant material lamina. The term "lamina" refers to the part of a plant leaf blade without the stem.

Preferably, the aerosol-forming substrate comprises cut-filler. In this document, "cut-filler" is used to refer to a blend of shredded plant material, in particular leaf lamina, processed stems and ribs, homogenized plant material, like for example made into sheet form using casting or papermaking processes. The cut filler may also comprise other after-cut, filler tobacco or casing. According to preferred embodiments of the invention, the cut-filler comprises at least 25 percent of plant leaf lamina, more preferably, at least 50 percent of plant leaf lamina, still more preferably at least 75 percent of plant leaf lamina and most preferably at least 90 percent of plant leaf lamina. Preferably, the plant material is one of tobacco, mint, tea and cloves, however, the invention is equally applicable to other plant material that has the ability to release substances upon the application of heat that can subsequently form an aerosol.

Preferably, the tobacco plant material comprises lamina of one or more of bright tobacco lamina, dark tobacco, aromatic tobacco and filler tobacco. Bright tobaccos are tobaccos with a generally large, light coloured leaves. Throughout the specification, the term "bright tobacco" is used for tobaccos that have been flue cured. Examples for bright tobaccos are Chinese Flue-Cured, Flue-Cured Brazil, US Flue-Cured such as Virginia tobacco, Indian Flue-Cured, Flue-Cured from Tanzania or other African Flue Cured. Bright tobacco is characterized by a high sugar to nitrogen ratio. From a sensorial perspective, bright tobacco is a tobacco type which, after curing, is associated with a spicy and lively sensation. According to the invention, bright tobaccos are tobaccos with a content of reducing sugars of between about 2.5 percent and about 20 percent of dry weight base of the leaf and a total ammonia content of less than about 0.12 percent of dry weight base of the leaf. Reducing sugars comprise for example glucose or fructose. Total ammonia comprises for example ammonia and ammonia salts. Dark tobaccos are tobaccos with a generally large, dark coloured leaves. Throughout the specification, the term "dark tobacco" is used for tobaccos that have been air cured. Additionally, dark tobaccos may be fermented. Tobaccos that are used mainly for chewing, snuff, cigar, and pipe blends are also included in this category. Typically, these dark tobaccos are air cured and possibly fermented. From a sensorial perspective, dark tobacco is a tobacco type which, after curing, is associated with a smoky, dark cigar type sensation. Dark tobacco is characterized by a low sugar to nitrogen ratio. Examples for dark tobacco are Burley Malawi or other African Burley, Dark Cured Brazil Galpao, Sun Cured or Air Cured Indonesian Kasturi. According to the invention, dark tobaccos are tobaccos with a content of reducing sugars of less than about 5 percent of dry weight base of the leaf and a total ammonia content of up to about 0.5 percent of dry weight base of the leaf. Aromatic tobaccos are tobaccos that often have small, light coloured leaves. Throughout the specification, the term "aromatic tobacco" is used for other tobaccos that have a high aromatic content, e.g. of essential oils. From a sensorial perspective, aromatic tobacco is a tobacco type which, after curing, is associated with spicy and aromatic sensation. Example for aromatic tobaccos are Greek Oriental, Oriental Turkey, semi-oriental tobacco but also Fire Cured, US Burley, such as Perique, Rustica, US Burley or Meriland. Filler tobacco is not a specific tobacco type, but it includes tobacco types which are mostly used to complement the other tobacco types used in the blend and do not bring a specific characteristic aroma direction to the final product. Examples for filler tobaccos are stems, midrib or stalks of other tobacco types. A specific example may be flue cured stems of Flue Cure Brazil lower stalk.

However, using a high amount of natural leaf in the cut filler requires high amounts of aerosol-former, in particular at low temperatures. According to the invention a special wrapper is provided that prevents the appearance of stains cause by the high aerosol-former content. In particular, it was found that a heat-conducting material, like for example metal prevents the appearance of stains very well. In that respect, it has been found that staining can be conveniently prevented irrespective of the orientation of the heat conducting layer in respect to the aerosol-forming substrate, that is, whether the heat-conducting layer faces towards the aerosol-forming substrate or whether the heat-conducting layer faces away from the aerosol-forming substrate.

Additionally, it has been found, that the heat-conducting layer can conveniently contribute positively to the energy distribution within the aerosol-generating article. By providing the laminated wrapper with a heat conductive layer, uniform heating of the aerosol-forming substrate of the aerosol-generating article can be achieved. In this regard, the aerosol-generating article may be used together with an aerosol-generating device as described in more detail below. An aerosol-generating device may comprise a heating element for heating the aerosol-forming substrate of the aerosol-generating article. The heating element emits heat for this purpose. By providing the heat conductive layer of the laminated wrapper, the heat emitted by a heating element may be uniformly distributed throughout the laminated wrapper. Due to the laminated wrapper being arranged at least partly wrapped around the aerosol-forming substrate, the heat conductive layer may aid uniform heating of the aerosol-generating substrate.

The heat insulating layer may prevent heat from escaping from the aerosol-forming substrate to the surroundings of the aerosol-forming article. Furthermore, the heat insulating layer may provide the structural stability of the laminated wrapper. The heat insulating layer may act as a support for the heat insulating layer.

The combination of a heat conductive layer and a heat insulating layer is particularly beneficial in heating the aerosol-forming substrate from within the aerosol-generating article, for example with a pin or a blade. According to the invention, the heat conductive layer and the heat insulating layer overlap along an axial direction of the aerosol-generating article. The axial direction is the direction along the longitudinal axis of the aerosol-generating article. Typically, the aerosol-generating article may have a rod shape. In this case, the axial direction is along the extension of the rod. The term 'overlap' denotes that at least a portion of the laminated wrapper comprises, in a radial direction, the heat conductive layer arranged adjacent to the heat insulating layer, while at least a different portion of the laminated wrapper comprises, in a radial direction, only the heat conductive layer or only the heat insulating layer. In other words, at least a portion of the laminated wrapper only comprises the heat conductive layer or only the heat insulating layer, while at least a different portion of the laminated wrapper comprises both of the heat conductive layer and the heat insulating layer. Again in other words, a part of the heat conductive layer is not covered by or does not cover the heat insulating layer or both.

Advantageously, the invention can benefit the formation of an aerosol in multiple different constructions:

Where the heat source is within the aerosol generating article (for example heated a blade or pin) and the metal layer is facing towards the aerosol-generating substrate. In such a construction, the heat conducting layer may absorb some of the heat dissipated from the heat source and heat the aerosol-generating substrate close to it. This can create a smooth average temperature across the entire aerosol-generating substrate.

Where the heat source is within the aerosol generating article (for example heated a blade or pin) and the metal layer is facing towards the aerosol-generating substrate. Due to the high aerosol-former content, the aerosol-former is likely to soak the insulating layer, in particular if made of paper, cotton, glass fibers, viscose or other similar material. This then may create a wicking effect as the heat conducting layer heats up and vaporises the aerosol former that is wicked towards the heat conducting layer.

Where the heat source is outside of the aerosol generating article and the metal layer is facing towards the aerosol-generating substrate. In this construction again the heat conducting layer may absorb heat from the heat source and radiate the heat directly to the aerosol-forming substrate that is in contact with the heat conducting layer. This way, heat is concentrated closer to the aerosol-forming substrate compared to an embodiment where no heat conducting layer is present and the heat has to permeate from the heat source to the article, probably through a corresponding paper wrapper.

Where the heat source is outside of the aerosol generating article and the metal layer is facing towards the aerosol-generating substrate. This construction may have the same benefit of wicking as described above, with the added benefit that the transfer from the heat source to the heat conducting layer is less interrupted.

Preferably, at least a portion of the laminated wrapper comprises the heat conductive layer. This portion of the laminated wrapper may be used for heating. This portion may also be referred to as heating area. In other words, this portion of the laminated wrapper may be arranged in proximity with to the heating element as described in more detail below such that this portion of the laminated wrapper may be optimally heated. Omitting or reducing the heat insulating layer in this portion of the laminated wrapper has the advantage that heat can optimally reach the heat conductive layer and the aerosol-forming substrate wrapped by the heat conductive layer. The provision of a heat insulating layer at this portion of the laminated wrapper would prevent heat from optimally reaching the heat conductive layer as well as the aerosol-forming substrate. However, providing the heat insulating layer at a different portion of the laminated wrapper achieves that heat that has been transmitted from the heating element to the heat conductive layer and to the aerosol-forming substrate stays inside of the aerosol-forming substrate of the aerosol-generating article. The portion of the laminated wrapper comprising the heat insulating layer is preferably a portion of the laminated wrapper which is arranged distanced from the heating element in comparison to the portion of the laminated wrapper only comprising the heat conductive layer.

The laminated wrapper may be wrapped around the full circumference of the aerosol-forming substrate of the aerosol-generating article. Alternatively, the laminated wrapper may not be fully wrapped around the aerosol-forming substrate, if desired. The laminated wrapper may thus only partly cover the circumference of the aerosol-forming substrate. An additional wrapper may be arranged wrapping around the aerosol-generating article. Particularly if the laminated wrapper is only partly covering the circumference of the aerosol-forming substrate, an additional wrapper may be provided to fully cover the aerosol-generating article.

The term 'laminated' regarding the wrapper denotes a wrapper, in which at least two layers are permanently assembled together, preferably by heat, pressure, welding, or adhesive. Preferably, the two layers are the heat insulating layer and the heat conductive layer. Potentially, the laminated wrapper may comprise further layers, if desired. Preferably, however, the heat conductive layer is arranged directly adjacent to the aerosol-forming substrate of the aerosol-generating article. Preferably, the heat insulating layer is arranged directly adjacent to the heat conductive layer. Preferably, the laminated wrapper consists of the heat conductive layer and the heat insulating layer.

The laminated wrapper may comprise at least one heating area in which the insulating layer is missing or reduced arranged. The heating area may also be referred to as a heating spot. Providing only the heat conductive layer at a portion of the laminated wrapper enables the heating area, in which heating energy may be optimally transmitted to the heat conductive layer and to the aerosol-forming substrate inside of the aerosol-generating article. The transmission of heat from the outside of the aerosol-generating article to the aerosol-forming substrate may be aided by the heat conductive layer of the laminated wrapper in the heating area. Preferably, adjacent to the heating area, the laminated wrapper comprises the heat conductive layer as well as the heat insulating layer. The heat conductive layer is preferably arranged inside of the heat insulating layer. In other words, the heat conductive layer is preferably arranged directly radially adjacent to the aerosol-forming substrate of the aerosol-generating article. The heat insulating layer is preferably arranged wrapped around a heat conductive layer. Heat applied in the heating area to the heat conductive layer may travel along an axial direction within the heat conductive layer. This heat will also travel in a radial direction to the inside of the aerosol-generating article, in which the aerosol forming substrate is provided. On the other hand, in the portion of the heat conductive layer which is covered by the heat insulating layer, the heat of the heat conductive layer may be insulated by the heat insulating layer. Thus, heat in the heat conductive layer will predominantly travel inside of the heat conductive layer in an axial direction as well as radially inwards, but not radially outwards.

A single heating area may be provided, in which only the heat conductive layer is provided wrapping the aerosol-generating substrate. Alternatively, multiple heating areas may be provided. In the respective heating areas, preferably only the heat conductive layer is provided surrounding the aerosol-generating substrate. In the portions of the laminated wrapper between the heating areas or adjacent to the heating areas, the laminated wrapper preferably additionally comprises the heat insulating layer wrapping around the heat conductive layer. As will be described in more detail below with respect to the aerosol-generating device, multiple heating areas may be used for different heating regimes of the heating element of the aerosol-generating device. Multiple sections of the aerosol-forming substrate may thus be heated by means of the multiple heating areas at the same time. Alternatively or additionally, a sequential heating of different heating areas may be realized.

The heating area may have an annular shape. An annular shape denotes the shape which fully extends around the circumference of the aerosol-forming substrate. An annular shape means that a cylindrical outer section of the aerosol-forming substrate is surrounded by the laminated wrapper, more particularly the heat conductive layer of the laminated wrapper, in the heating area. Advantageously, an annular shape of the heating area achieves a uniform surround heating of the aerosol-forming substrate. In other words, preferably, an annular shape of the heating area may create a ring shaped heating zone. The heat conductive layer may comprise one or more of aluminium, tin and copper.

These materials may have a high heat conductivity. These materials may thus optimally transfer heat towards the aerosol-forming substrate arranged on the inside of the aerosol-generating article. Additionally, axial heat transfer within the heat conductive layer may be optimized by providing a material with high heat conductivity. Further, combustion of the aerosol-generating article may be prevented by these materials of the heat conductive layer. In this regard, the aerosol-generating article according to the present invention may be used for heat-not-burn devices, in which the aerosol-forming substrate is heated to create an inhalable aerosol, but not burnt. Preventing the combustion of the aerosol-forming substrate prevents the formation of unwanted aerosol constituents. A user may accidentally or intentionally try to lighten the aerosol-generating article. By means of the materials of the heat conductive layer, such an unwanted lightening can be prevented. In other words, the heat conductive layer may be airtight. Consequently, advantageously, secure handling of the aerosol-generating article of the present invention is improved and the use of the aerosol-generating article in an unintended way can be prevented.

The cut-filler suitable to be used with the present invention generally may resemble to cut-filler used for conventional smoking articles. The cut width of the cut filler preferably is between 0.3 millimeters and 2.0 millimeters, more preferably, the cut width of the cut filler is between 0.5 millimeters and 1.2 millimeters and most preferably, the cut width of the cut filler is between 0.6 millimeters and 0.9 millimeters. The cut width may play a role in the distribution of heat inside the substrate portion of the article. Also, the cut width may play a role in the resistance to draw of the article. Further, the cut width may impact the overall density of the substrate portion.

The strand length of the cut-filler is to some extent a random value as the length of the strands will depend on the overall size of the object that the strand is cut off from. Nevertheless, by conditioning the material before cutting, for example by controlling the moisture content and the overall subtlety of the material, longer strands can be cut. Preferably, the strands have a length of between about 10 millimeters and about 40 millimeters before the strands are formed into the substrate section. Obviously, if the strands are arranged in a substrate section in a longitudinal extension where the longitudinal extension of the section is below 40 millimeters, the final substrate section may comprise strands that are on average shorter than the initial strand length. Preferably, the strand length of the cut-filler is such that between about 20 percent and 60 percent of the strands extend along the full length of the substrate portion. This prevents the strands from dislodging easily from the substrate section.

In preferred embodiments, the weight of the aerosol-forming substrate is between 80 milligrams and 400 milligrams, preferably between 150 milligrams and 250 milligrams, more preferably between 170 milligrams and 220 milligrams. This amount of aerosol forming typically allows for sufficient material for the formation of an aerosol. Additionally, in the light of the aforementioned constraints on diameter and size, this allows for a balanced density of the aerosol-forming substrate between energy uptake, resistance to draw and fluid passageways within the substrate section where the substrate comprises plant material.

According to the invention, the aerosol-forming substrate is soaked with aerosol former. Soaking the aerosol-forming substrate can be done by spraying or by other suitable application methods. The aerosol former may be applied to the blend during preparation of the cut-filler. For example, the aerosol former may be applied to the blend in the direct conditioning casing cylinder (DCCC). Conventional machinery can be used for applying an aerosol former to the cut-filler. The aerosol former may be any suitable known compound or mixture of compounds that, in use, facilitates formation of a dense and stable aerosol. The aerosol former may be facilitating that the aerosol is substantially resistant to thermal degradation at temperatures typically applied during use of the aerosol-generating article. Suitable aerosol formers are for example: polyhydric alcohols such as, for example, triethylene glycol, 1,3-butanediol, propylene glycol and glycerine; esters of polyhydric alcohols such as, for example, glycerol mono-, di- or triacetate; aliphatic esters of mono-, di- or polycarboxylic acids such as, for example, dimethyl dodecanedioate and dimethyl tetradecanedioate; and combinations thereof.

The aerosol former may comprise one or more of glycerine and propylene glycol. The aerosol former may consist of glycerine or propylene glycol or of a combination of glycerine and propylene glycol.

Preferably, the amount of aerosol former is between 6 percent and 20 percent by weight on a dry weight basis of the aerosol-forming substrate, more preferably, the amount of aerosol former is between 8 percent and 18 percent by weight on a dry weight basis of the aerosol-forming substrate, most preferably the amount of aerosol former is between 10 percent and 15 percent by weight on a dry weight basis of the aerosol-forming substrate. For some embodiments the amount of aerosol former has a target value of about 13 percent by weight on a dry weight basis of the aerosol-forming substrate. The most efficient amount of aerosol former will depend also on the aerosol-forming substrate, whether the aerosol-forming substrate comprises plant lamina or homogenized plant material. For example, among other factors, the type of substrate will determine to which extent the aerosol-former can facilitate the release of substances from the aerosol-forming substrate.

The aerosol-forming substrate of the present invention generates aerosol at lower temperature than known tobacco cast leave (TCL) sheets. As the aerosol former is impregnated on the cut filler, and is therefore provided on the outside surface of the cut-filler, already lower temperatures are sufficient to generate an aerosol. Also nicotine and flavors comprised in the cut-filler blend are more easily resolved following the natural internal structure of the cut-filler to become available for the aerosol former to generate the inhalable aerosol. In contrast thereto, artificially generated tobacco cast leave sheets have a rather chaotic internal structure that may hamper migration of active ingredients to the surface.

For these reasons, the aerosol-forming substrate utilized in the aerosol-generating article of the present invention may be capable of efficiently generating sufficient amount of aerosol at a relatively lower temperature than the previously used consumables using tobacco cast leave sheets. A temperature of between 150 degrees Celsius and 200 degrees Celsius in the heating chamber may be sufficient for the aerosol-forming substrate of the present invention to generate sufficient amounts of aerosol while in aerosol-generating devices using tobacco cast leave sheets typically temperatures of about 250 degrees Celsius are employed.

A further advantage of the present invention connected with operating at lower temperatures is that it is not the requirement to cool down the aerosol is reduced. As generally low temperatures are used, a simpler cooling function may be sufficient. This in turn allows using a simpler and less complex structure of the aerosol-generating article.

Therefore, advantageously, the aerosol-generating article of the present invention comprises exclusively a substrate portion in which the aerosol-forming substrate is provided, without any additional segments or section. Such embodiment would have a particularly simple structure.

The aerosol-generating article may comprise a substrate portion containing the aerosol-forming substrate and a filter portion. The filter portion preferably is arranged downstream of the substrate portion. The substrate portion may be arranged in direct abutment to the filter portion. The filter portion may comprise for example a hollow tubular filter portion, preferably a hollow acetate tube (HAT), a fine hollow acetate tube (FHAT) or a plug of tow wrapped around a central cardboard tube, all of which structures being known from manufacture of filter elements. The filter portion preferably comprises a hollow central space.

If desired or required, for example to achieve a sufficiently high resistance to draw of the aerosol-generating article, an additional filter section may be included in the aerosol-generating article. Preferably such additional filter section may be included between the substrate portion and the mouth end portion. Preferably, such additional filter section comprises a filtration material such as, for example, cellulose acetate. Preferably, the length of the additional filter section is between about 4 millimeters and about 8 millimeters, preferably, between about 5 millimeters and about 7 millimeters. Preferably, the combined length of the additional filter section and the hollow tubular filter portion is between about 10 millimeters and about 18 millimeters, preferably, 13 millimeters.

As used herein, the terms 'upstream' and 'downstream' are used to describe the relative positions of components, or portions of components, of the aerosol-generating article according to the invention in relation to the direction of air drawn through the aerosol-generating article during use of the aerosol-generating article.

The laminated wrapper may be provided covering the substrate portion or the substrate portion and the filter portion. The laminated wrapper may at least partially cover the substrate portion. Alternatively, the laminated wrapper may fully cover the substrate portion. Alternatively, the laminated wrapper may partially cover the substrate portion and partially cover the filter portion. Alternatively, the laminated wrapper may or fully cover the substrate portion and partially cover the filter portion or partially cover the substrate portion and fully cover the filter portion.

The laminated wrapper may cover a length of 20 millimeters to 35 millimeters of the aerosol-substrate portion. If the aerosol-generating article comprises a filter portion, the laminated wrapper may cover a length of 20 millimeters to 50 millimeters of the aerosol-generating article. The laminated wrapper may cover at least 50%, more preferably at least 70%, more preferably at least 90% of the length of the aerosol-forming substrate.

If the laminated wrapper is provided at least partially covering the filter portion, optimized heat insulation may be provided in the filter portion. In this regard, aerosol generated by heating the substrate portion containing the aerosol forming substrate of the aerosol-generating article may be drawn towards end of the filter portion. Insulating the filter portion may optimize aerosol maintenance, while the aerosol flows through the filter portion. This effect may particularly be achieved by the heat insulating layer of the laminated wrapper. Additionally, the heat conductive layer of the laminated wrapper may transfer heat towards the surrounding of the filter portion. This heat may optimize aerosol maintenance in the filter portion or even help creating aerosol in the filter portion. Additionally, insulating the filter portion of the aerosol-generating article may advantageously prevent the unintended degradation of the filter portion by the applied heat.

The filter portion may be formed from any suitable material or combination of materials. For example, the filter portion may be formed from one or more materials selected from the group consisting of: cellulose acetate; cardboard; paper, such as crimped heat resistant paper or crimped parchment paper; cotton; viscose; glass fibres; and other polymeric materials, such as low density polyethylene (LDPE). In a preferred embodiment, the filter portion is formed from cellulose acetate.

The filter portion may comprise a hollow tubular element. In a preferred embodiment, the filter portion comprises a hollow cellulose acetate tube.

The filter portion preferably has an external diameter that is approximately equal to the external diameter of the aerosol-generating article.

The filter portion may have an external diameter of between approximately 4 millimeters and approximately 8 millimeters, for example of between approximately 5 millimeters and approximately 6 millimeters, preferably around 5.3 millimeters. The filter portion may have a length of between approximately 10 millimeters and approximately 25 millimeters.

The aerosol-generating article may be substantially cylindrical in shape. However, alternatively other cross sections may be used. Indeed, the cross section of the aerosol-generating article may vary along its length, for example by varying the shape of the cross section or the cross sectional dimensions. The aerosol-generating article may be substantially elongate. The aerosol-generating article may have a length and a circumference substantially perpendicular to the length. The aerosol-forming substrate may be substantially cylindrical in shape. The aerosol-forming substrate may be substantially elongate. The aerosol-forming substrate may also have a length and a circumference substantially perpendicular to the length.

The aerosol-generating article may have a total length between 30 millimeters and 60 millimeters, preferably between 40 millimeters and 50 millimeters, more preferably 45 millimeters. The aerosol-generating article may have an external diameter between approximately 4 millimeters and 8 millimeters, preferably between 5 millimeters and 6 millimeters, more preferably around 5.3 millimeters. In one embodiment, the aerosol-generating article has a total length of approximately 45 millimeters. Further, the aerosol-forming substrate may have a length of between 20 millimeters to 55 millimeters. Preferably, the aerosol-forming substrate employed in the aerosol-generating article is a non-liquid aerosol-forming substrate. As used herein, the term 'non-liquid aerosol-forming substrate' relates to a substrate capable of releasing volatile compounds that can form an aerosol. Such volatile compounds may be released by heating the aerosol-forming substrate. An aerosol-forming substrate may conveniently be part of an aerosol-generating article or smoking article.

The aerosol-forming substrate is a substrate capable of releasing volatile compounds that can form an aerosol. The volatile compounds may be released by heating the aerosol-forming substrate. The aerosol-forming substrate may comprise nicotine. The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may alternatively comprise a non-tobacco-containing material. The aerosol-forming substrate may comprise homogenised plant-based material, including homogenized tobacco, for example made by, for example, a paper making process or a casting process. Preferably, the aerosol-forming substrate is provided as cut-filler impregnated with an aerosol former.

The heat insulating layer may comprise one or more of paper, preferably cigarette wrapping paper, cotton or glass fibres. These materials have a high heat insulation. Additionally, these materials are readily available.

The laminated wrapper may have a thickness of between 30 micrometers and 100 micrometers, preferably of between 50 micrometers and 70 micrometers, preferably between 55 micrometers and 58 micrometers, more preferably about 56.5 micrometers.

Throughout the document the term 'about' accounts for an intrinsic variation of up to ±2 digits on the last digit. For example, the term 'about 56.5 micrometers' may include a range from 56.3 micrometers to 56.7 micrometers. Alternatively, the term 'about' may include an uncertainty of up to 5%, whichever value is greater.

The thickness of the laminated wrapper may enable lamination of the heat insulating layer and the heat conductive layer. Also, dimensional stability of the laminated wrapper may be achieved.

The heat conductive layer may have a thickness of between 4 micrometers and 25 micrometers, preferably between 5 micrometers and 10 micrometers, preferably between 6 micrometers and 7 micrometers, more preferably about 6.5 micrometers.

The thickness of the conductive layer may optimize heat distribution. The thickness of the conductive layer may enable axial heat transfer through the conductive layer as well as a heat transfer in a radial inwards direction towards the aerosol-forming substrate.

The heat insulating layer may have a thickness of between 25 micrometers and 75 micrometers, preferably between 40 micrometers and 60 micrometers, more preferably 50 micrometers.

The thickness of the heat insulating layer may optimize heat insulation. The heat insulating layer may act as a layer to increase the structural integrity of the laminated wrapper. The heat insulating layer may form a support for the heat conductive layer.

The heat insulating layer may be arranged surrounding the heat conductive layer. Heat may be trapped inside of the aerosol-generating article by the heat insulating layer surrounding the heat conductive layer. Preferably, the heat insulating layer is the outermost layer of the aerosol-generating article.

The aerosol-generating article may have an asymmetric cross-section. The term 'asymmetric cross-section' denotes a profile or cross-section of the aerosol-generating article, which only enables insertion of the aerosol-generating article into a heating chamber of an aerosol-generating device in a specific orientation or in multiple specific orientations. In this case, the heating chamber would preferably have a corresponding cross-section, which will be described below in more detail with respect to the aerosol-generating device. A circular cross-section is not an asymmetric cross-section. A rectangular cross-section may be considered an asymmetric cross-section according to the present invention. A rectangular cross-section may only allow insertion of the aerosol-generating article in two or four orientations. Four orientations would be enabled, if the cross-section of the aerosol-generating article would be square, otherwise two orientations would be enabled. The cross-section of the aerosol-generating article could also have a shape such that the aerosol-generating article inserted into the correspondingly shaped heating chamber could only be inserted in a single orientation. An insertion which is only enabled in one or more specific orientations may also be denoted as a keyed configuration of the aerosol-generating article. The term asymmetric cross-section ignores in the consideration of symmetry the inherent structure of the aerosol-forming substrate, in particular the random orientation of cut-filler strips.

The laminated wrapper may comprise multiple heat conductive layers overlapping each other in the axial direction of the aerosol-generating article. According to this aspect, different heating areas of the aerosol-generating article are defined, seen in an axial direction of the aerosol-generating article. In the different heating areas, different numbers of the conductive layers may overlap. Preferably, in a first heating area, a single heat conductive layer may be provided. This first heating area may be configured similar to the heating area described above. In this first heating area, preferably only the single heat conductive layer is provided without the laminated wrapper comprising a heat insulating layer. In a second heating area, two heat conductive layers may be provided adjacent to each other in a radial direction of the aerosol-generating article. In other words, two heat conductive layers may cover the aerosol-forming substrate in the second heating area. Providing multiple heat conductive layers has the effect that heat may take a longer time from being transmitted from the outside of the aerosol-generating article into the inside of the aerosol-generating article where the aerosol-forming substrate is provided. Consequently, a staged heating may be provided by these different heating areas. Of course, more than two heating areas could be provided. For example, a third heating area could be provided, in which three heat conductive layers are arranged surrounding the aerosol-forming substrate. More than three heating areas may be provided. Preferably, each additional heating area comprises a further heat conductive layer. The heat conductive layer of the first heating area may extend over all heating areas. The heat conductive layer of the second heating area may extend over the second heating area and all additional heating areas, but not the first heating area. In this way, a relatively simple arrangement could be achieved in which multiple heating areas are provided for a staged heating effect. The staged heating effect may generate a heating delay in the different heating areas of the aerosol-generating article. Thus, gradual vaporization of the aerosol-forming substrate may be achieved in the heating areas. One heating area may be provided for a single puff, so that for each puff, an optimized substrate vaporization may be realized. The aerosol-generating article may be configured for a specific number of puffs and the number of heating areas may correspond to this specific number of puffs.

Additionally or alternatively to providing multiple heat conductive layers, multiple heat insulating layers may be provided. The multiple heating areas as described above may comprise multiple heat insulating layers. The laminated wrapper may comprise a fixed total number of layers. In each of the multiple heating areas, the total number of layers may correspond to the total number of layers of the laminated wrapper. For example, if the laminated wrapper comprises four layers, an insulating area may be provided, in which only four insulating layers are arranged. In a first heating area, a single heat conductive layer may be provided and three heat insulating layers. In a second heating area, two heat conductive layers and to heat insulating layers may be provided. In a third heating area, three conductive layers and one heat insulating layer may be provided. Finally, in a fourth heating area, for conductive layers may be provided and no insulating layer. Of course, this example is only to be understood exemplarily. Less or more heating areas may be provided as desired. If heat insulating layers are provided as described herein in the heating areas, a heating area with the highest number of heat conductive layers and the lowest number of heat insulating layers is likely to transfer the highest amount of heat energy from outside of the aerosol-generating article into the inside of the aerosol-generating article in which the aerosol-forming substrate is arranged. Each successive heating area, in which the number of heat conductive layers decreases and the number of heat insulating layer increases, is likely to transfer less heat energy from the outside of the aerosol-generating article into the inside of the aerosol-generating article. Exemplarily, if the heating element of an aerosol-generating device would uniformly heat the outside of the aerosol-generating article, heat would gradually reach the inside of the aerosol-generating article for creating an inhalable aerosol. This effect might be desired to create a staged heating effect. Additionally, by providing a laminated wrapper with a fixed number of layers, the thickness of the laminated wrapper and therefore the diameter of the aerosol-generating article may be kept constant.

The heat conductive layer may comprise one or more of holes, a ring shape, a helical shape, a helical shape with width changes, axial variations and radial thickness changes.

Different shapes of the heat conductive layer may realize different heating regimes. For optimizing vaporization of the aerosol-forming substrate, these different shapes of the heat conductive layer may be beneficially employed. If multiple heat conductive layers are provided, each heat conductive layer may have a desired shape which may be similar or different to the shape of the further heat conductive layers. The heat insulating layer of the laminated wrapper arranged partly covering the heat conductive layer may be arranged so that the shape of the heat conductive layer that is not covered by the heat insulating layer may have different shapes. For example, a ring shape of the heat conductive layer may be realized in a uniform of a heat conductive layer which is partly covered by the heat insulating layer so that a ring shaped portion of the heat conductive layer is not covered by the heat insulating layer. The same may be applied for the further above-mentioned shapes of the heat conductive layer. Alternatively, the heat conductive layer itself may have such a shape. If the conductive layer has axial variations, preferably, the heating areas as described above are shaped differently from each other. For example, the first heating area may have an annular shape with a relatively small axial length followed by a second heating area with a longer axial length. For example, the actual length of a first heating area may be around 1 millimeters, and the axial length of a second heating area may be around 2 millimeters. This is only to be understood exemplarily. Any desired axial length and shape of one or more heating areas may be chosen. Radial thickness changes of the heat conductive layer means that the heat conductive layer does not have a uniform thickness. In some embodiments the thickness of the conductive layer may vary over the axial length of the heat conductive layer. Particularly, the different heating areas as described above may be a single heat conductive layer with a varying thickness instead of multiple heat conductive layers. Similarly, the thickness of the heat insulating layer may vary, if desired.

The invention also relates to an aerosol-generating device comprising a heating chamber and a heating element arranged adjacent to the heating chamber. The heating chamber is configured for insertion of an aerosol-generating article as described above. When an aerosol-generating article is inserted into the heating chamber, the heating element is configured to heat a heating area of the aerosol-generating article, in which only the heat conductive layer is arranged.

The heating chamber may have a cylindrical shape for insertion of the aerosol-generating article. The heating chamber may be a cavity. The heating chamber may have a circular profile or cross-section. If the aerosol-generating article has an asymmetric profile, as described above, the heating chamber preferably has a corresponding asymmetric profile. For example, if the aerosol-generating article has a rectangular profile, the heating chamber preferably has a rectangular profile. If the aerosol-generating article has an asymmetric profile configured to enable insertion of the aerosol-generating article into the heating chamber in only a single orientation, the heating chamber preferably has a corresponding cross-section. For example, the aerosol-generating article may comprise a groove, nut, shoulder or a similar element along the length of the aerosol-generating article and on the outside of the aerosol-generating article, the heating chamber may comprise a corresponding groove, nut, shoulder or similar element to engage with the element of the aerosol-generating article to enable insertion of the aerosol-generating article in a single specific orientation.

The heating element may be arranged inside or around the heating chamber. The heating element may be arranged inside or around the heating chamber for heating an aerosol-generating article insertable into the heating chamber. Alternatively, or in addition, an internal heating element may be provided, for example a pin or a blade that is inserted for use at least partly into the aerosol-forming substrate.

For example, the device may include an external heating element positioned around a perimeter of the heating chamber. An external heating element may take any suitable form. For example, an external heating element may take the form of one or more flexible heating foils on a dielectric substrate, such as polyimide. The flexible heating foils can be shaped to conform to the perimeter of the heating chamber. Alternatively, an external heating element may take the form of a metallic grid or grids, a flexible printed circuit board, a moulded interconnect device (MID), ceramic heating element, flexible carbon fibre heating element or may be formed using a coating technique, such as plasma vapour deposition, on a suitable shaped substrate. An external heating element may also be formed using a metal having a defined relationship between temperature and resistivity. In such an exemplary device, the metal may be formed as a track between two layers of suitable insulating materials. An external heating element formed in this manner may be used to both heat and monitor the temperature of the external heating element during operation. The heating element may be configured to heat to a temperature of around 200 degrees Celsius. The heating element may also be configured as an inductive heating element, in which case the heating element preferably comprises an induction coil. In this embodiment, the aerosol-forming substrate of the aerosol-generating article may comprise a susceptor material for creating heat inside of the aerosol-forming substrate. Alternatively, in this embodiment, a susceptor material, for example in the shape of a blade or pin, may be arranged inside of the heating chamber for penetrating the aerosol-forming substrate of an aerosol-generating article, when the aerosol-generating article is inserted into the heating chamber.

The heating element may be arranged around the heating chamber to uniformly heat the heating chamber. This may have the effect that the aerosol-generating article, particularly the substrate portion of the aerosol-generating article, is uniformly heated, when the aerosol-generating article is inserted into the heating chamber. As described above, the laminated wrapper surrounding the aerosol-generating article may have a specific structure to allow a staged heating of the aerosol-forming substrate inside of the aerosol-generating article. Particularly, the laminated wrapper may create different heating areas. These different heating areas may particularly be utilized, when the aerosol-generating article is uniformly heated from the outside by means of the heating element arranged surrounding the heating chamber.

Alternatively, the heating element may be configured to heat specific areas of the aerosol-generating article, when the aerosol-generating article is inserted into the heating chamber. The heating element may comprise multiple separately controllable heating portions for the purpose. These separately controllable heating portions may be arranged along the longitudinal length of the heating chamber to heat separate sections of the aerosol-generating article. Preferably, the separately controllable heating portions a configured to heat different heating areas of the aerosol-generating article. The separately controllable heating portions may each fully surround the heating chamber. The separately controllable heating portions may be controllable by electric circuitry, which is described below in more detail. Alternatively or additionally, the separately controllable heating portions may be arranged parallel to the longitudinal axis of the heating chamber. Instead of separately controllable heating portions, the heating element may be configured to generate a heating gradient during heating. The heating element may be configured to create heating gradient along the longitudinal axis of the heating chamber of parallel to the longitudinal axis of the heating chamber.

The heating element may be configured to emit heat towards the aerosol-generating article, when the aerosol-generating article is inserted into the heating chamber. The heat may be optimally absorbed and transferred by the heat conductive layer of the laminated wrapper of the aerosol-generating article. The heat may be emitted or transferred by the heat conductive layer to the aerosol-forming substrate of the aerosol-generating article. This effect is particularly useful if the heat source is not applying the heat homogenously. Accordingly, the heat conducting layer can transport the heat from the heat source along the aerosol-generating substrate and distribute it as needed, either homogenously where the coverage of the heat-conducting layer is homogenous across the entire aerosol-generating substrate. Alternatively, the heat from heat source is distributed selectively across the entire aerosol-generating substrate where the coverage of the heat-conducting layer is not complete across the entire aerosol-generating substrate.

As used herein, an 'aerosol-generating device' relates to a device that interacts with an aerosol-forming substrate to generate an aerosol. The aerosol-forming substrate may be part of an aerosol-generating article. An aerosol-generating device may be a device that interacts with an aerosol-forming substrate of an aerosol-generating article to generate an aerosol. The aerosol-generating device may comprise a housing, electric circuitry, a power supply, a heating chamber and a heating element. The aerosol-generating device may optionally comprise a mouthpiece The electric circuitry may comprise a microprocessor, which may be a programmable microprocessor. The microprocessor may be part of a controller. The electric circuitry may comprise further electronic components. The electric circuitry may be configured to regulate a supply of power to the heating element. Power may be supplied to the heating element continuously following activation of the system or may be supplied intermittently, such as on a puff-by-puff basis. The power may be supplied to the heating element in the form of pulses of electrical current. The electric circuitry may be configured to monitor the electrical resistance of the heating element, and preferably to control the supply of power to the heating element dependent on the electrical resistance of the heating element.

The device may comprise a power supply, typically a battery, within the main body. As an alternative, the power supply may be another form of charge storage device such as a capacitor. The power supply may require recharging and may have a capacity that enables to store enough energy for one or more usage experiences; for example, the power supply may have sufficient capacity to continuously generate aerosol for a period of around six minutes or for a period of a multiple of six minutes. In another example, the power supply may have sufficient capacity to create an aerosol for multiple puffs.

The power supply may be any suitable power supply, for example a DC voltage source such as a battery. In one embodiment, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery.

The aerosol-generating device may comprise a mouthpiece. The mouthpiece may be a separate element or integrally formed with the aerosol-generating device. The mouthpiece may be connectable or connected with the aerosol-generating device, preferably by a hinge. The mouthpiece may be configured as a venturi element. The mouthpiece may be configured connectable with the aerosol-generating article. The mouthpiece may be configured insertable into the filter portion of the aerosol-generating article.

The invention also relates to a system comprising an aerosol-generating device as described herein and an aerosol-generating article as described herein. The invention also relates to a system comprising an aerosol-generating article as described herein and a mouthpiece, preferably a venturi element, as described herein. The invention also relates to a system comprising an aerosol-generating device, an aerosol-generating article, and a mouthpiece.

The invention also relates to a method for manufacturing an aerosol-generating article, wherein the method may comprise the following steps:
  i. providing an aerosol-generating article comprising aerosol-forming substrate, wherein the aerosol-forming substrate comprises plant material cut filler, and wherein the plant material cut filler comprises at least 25 percent of plant lamina per weight of the total plant material and wherein the aerosol-forming substrate further comprises between about 6 percent and about 20 percent of an aerosol-former, and
  ii. at least partly wrapping a laminated wrapper around the aerosol-forming substrate, wherein the laminated wrapper comprises a heat conductive layer and a heat insulating layer, and wherein the heat conductive layer and the heat insulating layer overlap along an axial direction of the aerosol-generating article.

The method may comprise the step of inserting the aerosol-generating article into the heating chamber of the aerosol-generating device. The method may comprise the step of heating the aerosol-generating article.

Features described in relation to one aspect may equally be applied to other aspects of the invention.

The invention will be further described, by way of example only, with reference to the accompanying drawings in which.

Figure 1:
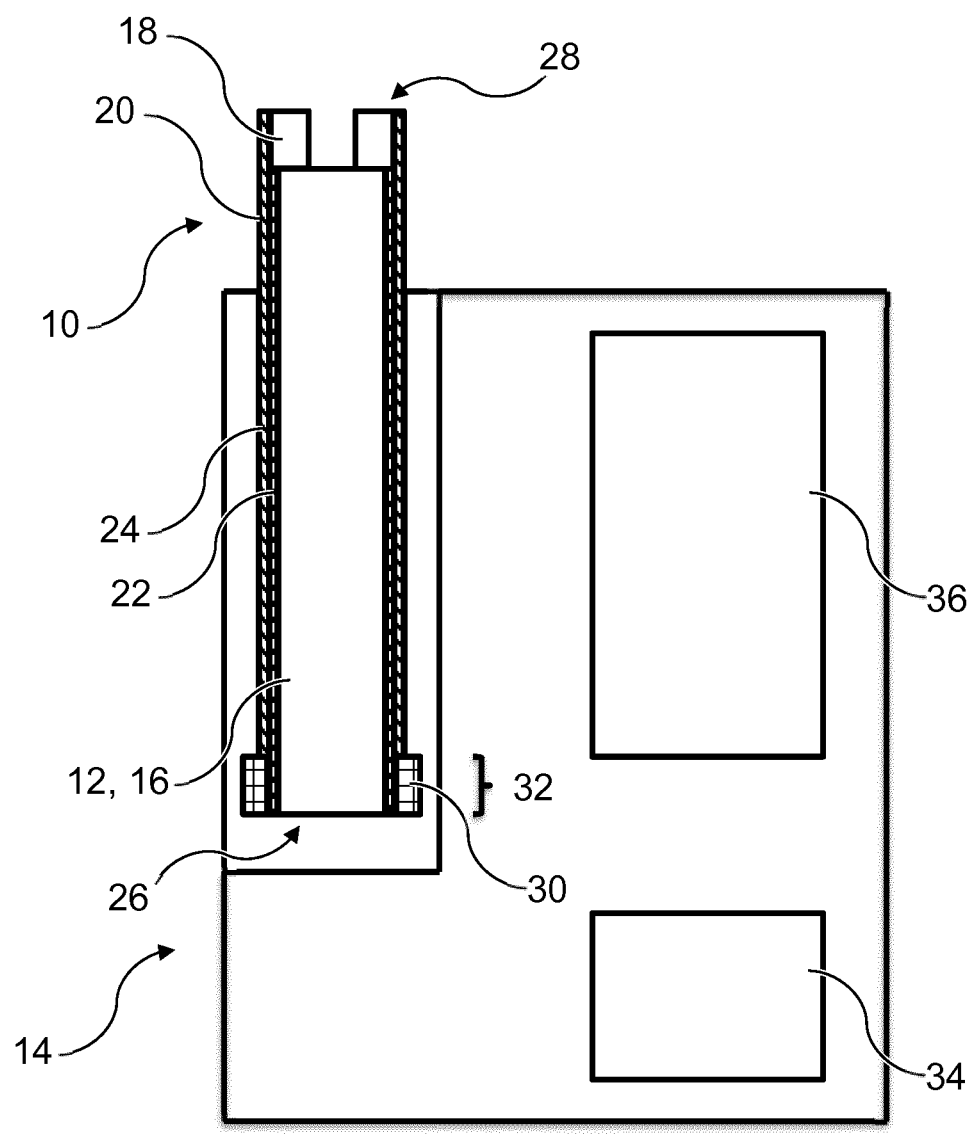
FIG. 1 shows a cross-sectional view of an aerosol-generating article inserted into a heating chamber of an aerosol-generating device.

FIG. 1 shows an aerosol-generating article 10. The aerosol-generating article 10 has been inserted into a heating chamber 12 of an aerosol-generating device 14. The aerosol-generating article 10 comprises a substrate portion 16 containing aerosol-forming substrate. In the embodiment shown in FIG. 1, the aerosol-generating article 10 additionally comprises a filter portion 18 in the form of a hollow acetate tube. The filter portion 18 is arranged downstream of the substrate portion 16. The filter portion 18 is optional.

FIG. 1 shows a laminated wrapper 20, which is wrapped around the substrate portion 16 and the filter portion 18 of the aerosol-generating article 10. If no filter portion 18 is provided, the laminated wrapper 20 is only wrapped around the substrate portion 16. The laminated wrapper 20 comprises a heat conductive layer 22 and a heat insulating layer 24. The heat conductive layer 22 is arranged on the inside, which means directly adjacent the aerosol-forming substrate or the filter portion 18. The heat insulating layer 24 is arranged wrapped around the heat conductive layer 22.

The heat insulating layer 24 and the heat conductive layer 22 overlap along the longitudinal length of the aerosol-generating article 10. In the embodiment shown in FIG. 1, the bottom part of the aerosol-generating article 10, which is the upstream end 26 of the aerosol-generating article 10, is only wrapped with the heat conductive layer 22. Thus, the substrate portion 16 is wrapped by the heat conductive layer 22. At the top part of the aerosol-generating article 10, which is the downstream end 28 of the aerosol-generating article 10, the filter portion 18 is provided. The filter portion 18 is only wrapped by the heat insulating layer 24 of the laminated wrapper 20. Between the part of the substrate portion 16 adjacent to the upstream end 26 of the aerosol-generating article 10 and the filter portion 18 adjacent to the downstream end 28 of the aerosol-generating article 10, the laminated wrapper 20 wrapping the aerosol-generating article 10 comprises the heat conductive layer 22 as well as the heat insulating layer 24.

When the aerosol-generating article 10 is inserted into the aerosol-generating device 14, as depicted in FIG. 1, a heating element 30 of the aerosol-generating device 14 may be arranged adjacent to the heat conductive layer 22 near the upstream end 26 of the aerosol-generating article 10. This region of the aerosol-generating article 10, only covered with the heat conductive layer 22, is configured as a heating area 32. In this area, the heat emitted by the heating element 30 directly travels into the heat conductive layer 22 of the laminated wrapper 20. The heat is therefore absorbed by the heat conductive layer 22 and further transmitted towards the aerosol-forming substrate contained within the aerosol-generating article 10. Additionally, the heat absorbed by the heat conductive layer 22 is transferred within the heat conductive layer 22 in an axial direction of the aerosol-generating article 10 so that uniform heating may be achieved. In other words, a relatively small heating element 30 may be provided for heating a relatively small heating area 32 of the aerosol-generating article 10 in comparison to the full size of the substrate portion 16 of the aerosol-generating article 10. Still, by means of the high thermal conductivity of the heat conductive layer 22, the heat may be distributed uniformly over the substrate portion 16 of the aerosol-generating article 10.

The heating element 30 may alternatively be arranged surrounding the whole heating chamber 12 or large parts of the heating chamber 12 so as to achieve a more uniform heating of the aerosol-generating article 10.

The heat insulating layer 24 absorbs the heat inside of the aerosol-generating article 10, when the heat has reached the inside of the aerosol-generating article 10 by means of the heat conductive layer 22. As can be seen in FIG. 1, the heat insulating layer 24 preferably extends over the filter portion 18 arranged adjacent to the downstream end 28 of the aerosol-generating article 10. In this way, heat does not escape, or escapes at a reduced rate, in the area of the filter portion 18. This functionality improves formation of the aerosol and stabilizes the aerosol, when the aerosol is drawn from the substrate portion 16 through the filter portion 18 during a puff.

For operating the aerosol-generating device 14, FIG. 1 shows further components of the aerosol-generating device 14. In this regard, the aerosol-generating device 14 comprises a power supply 34, preferably a battery, for powering the heating element 30. The supply of electrical energy from the power supply 34 towards the heating element 30 is controlled by electric circuitry 36.

Figure 2:
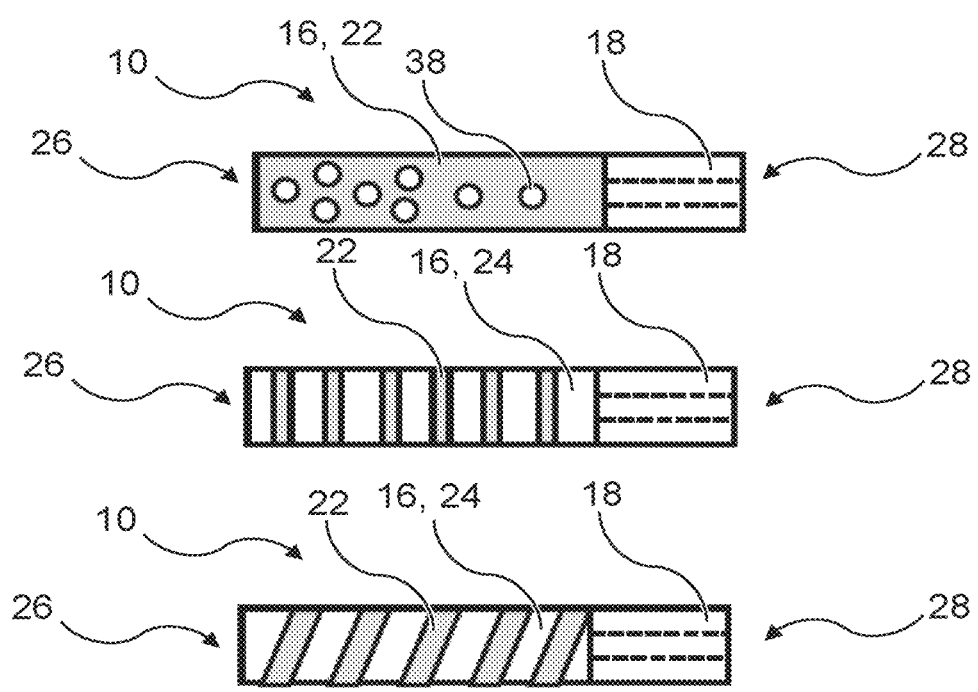
FIG. 2 shows different embodiments of a heat conductive layer of a laminated wrapper of the aerosol-generating article.

As will be explained below with respect to FIGS. 2 and 3, a staged heating effect may be achieved by the laminated wrapper 20 of the aerosol-generating article 10. FIG. 2 shows different embodiments of the laminated wrapper 20, more particularly of the heat conductive layer 22 of the laminated wrapper 20. The top part of FIG. 2 shows an embodiment, in which holes 38 are provided in the heat conductive layer 22. The holes 38 may change the heat transfer characteristics of the heat conductive layer 22. As indicated in the left part of the aerosol-generating article 10 depicted in the top part of FIG. 2, more holes 38 may be provided at an upstream region of the substrate portion 16 in comparison to a downstream region of the substrate portion 16. As a consequence, heating areas 32 may be realized, in which the aerosol-forming substrate is heated faster or slower. A staged heating effect may thus be achieved.

The middle part of FIG. 2 shows an embodiment, in which the heat conductive layer 22 is provided having an annular shape. Multiple heating areas 32 are provided by multiple annular rings surrounding the circumference of the aerosol-forming substrate. The portions between the heating areas 32 may be covered by one or more heat insulating layers 24.

The bottom part of FIG. 2 shows an embodiment, in which the heat conductive layer 22 has a helical configuration. This embodiment may be achieved by providing a strip of heat conductive layer 22 and winding the strip around the aerosol-forming substrate. Alternatively, a continuous heat conductive layer 22 may be provided, wherein the portions in between the helical parts of the heat conductive layer 22 may be covered by one or more heat insulating layers 24.

The helical parts of the heat conductive layer 22 may realize heating areas 32 of the aerosol-generating article 10.

Figure 3:
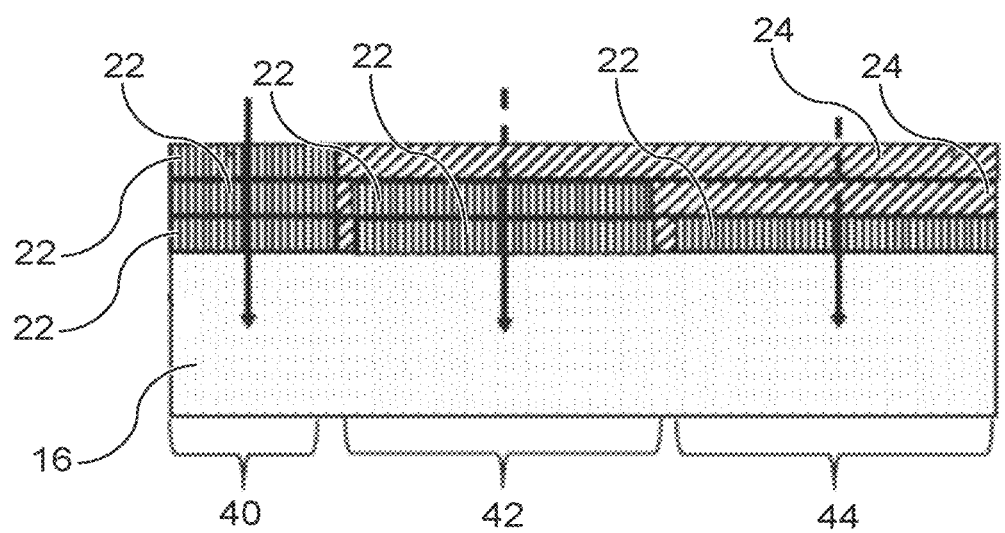
FIG. 3 shows a cross-sectional view of an embodiment of the laminated wrapper with multiple heat conductive layers and multiple heat insulating layers.

FIG. 3 shows a further embodiment of the laminated wrapper 20, in which multiple heat insulating layers 24 and multiple heat conductive layers 22 are provided. The embodiment shown in FIG. 3 is particularly beneficial, if the heating element 30 of the aerosol-generating device 14 uniformly heats the surrounding of the aerosol-generating article 10, when the aerosol-generating article 10 is inserted into the heating chamber 12. The multiple layers of the laminated wrapper 20 shown in FIG. 3 are provided to create multiple heating regions. The left part of the laminated wrapper 20 depicted in FIG. 3 shows a first heating area 40, in which three heat conductive layers 22 are provided. In this region, heat can travel fast through the heat conductive layers 22 and into the heat-forming substrate contained within the heat-generating article. The middle part of the laminated wrapper 20 shows a second heating area 42, in which two heat conductive layers 22 are arranged surrounding the aerosol-forming substrate, while a single heat insulating layer 24 is arranged surrounding the two heat conductive layers 22. This second heating area 42 will take longer to heat up due to the heat insulating layer 24. If all heating areas are uniformly heated by the heating element 30 of the aerosol-generating device 14, a staged heating effect may thus be achieved as indicated by the arrows in FIG. 3, which indicate the direction of heat. The first heating area 40 may be heated faster than the second heating area 42. The right part of FIG. 3 shows a third heating area 44, in which only a single heat conductive layer 22 is provided, while two heat insulating layers 24 are provided. This heating area will heat up even slower than the second heating area 42.

The invention claimed is:

1. An aerosol-generating article, comprising:
   an aerosol-forming substrate comprising plant material cut filler and between about 6 percent and about 20 percent of an aerosol-former, wherein the plant material cut filler comprises at least 25 percent of plant lamina per weight of total plant material; and
   a laminated wrapper comprising a heat conductive layer and a heat insulating layer, the laminated wrapper being arranged at least partly wrapped around the aerosol-forming substrate,
   wherein the laminated wrapper only covers the aerosol-forming substrate,
   wherein the laminated wrapper has a thickness of between 30 micrometers and 100micrometers, and
   wherein the heat conductive layer and the heat insulating layer overlap along an axial direction of the aerosol-generating article.

2. The aerosol-generating article according to claim 1, wherein the laminated wrapper further comprises at least one heating area in which only the heat conductive layer is arranged.

3. The aerosol-generating article according to claim 2, wherein the at least one heating area has an annular shape.

4. The aerosol-generating article according to claim 1, wherein the heat conductive layer comprises one or more of aluminium, tin, and copper.

5. The aerosol-generating article according to claim 1, wherein the heat insulating layer comprises paper.

6. The aerosol-generating article according to claim 1, wherein the heat insulating layer comprises cigarette wrapping paper.

7. The aerosol-generating article according to claim 1, wherein the laminated wrapper has a thickness of between 50 micrometers and 70micrometers.

8. The aerosol-generating article according to claim 1, wherein the laminated wrapper has a thickness of about 56.5 micrometers.

9. The aerosol-generating article according to claim 1, wherein the heat conductive layer has a thickness of between 4 micrometers and 25 micrometers.

10. The aerosol-generating article according to claim 1, wherein the heat conductive layer has a thickness of about 6.5 micrometers.

11. The aerosol-generating article according to claim 1, wherein the heat insulating layer has a thickness of between 25 micrometers and 75 micrometers.

12. The aerosol-generating article according to claim 1, wherein the heat insulating layer has a thickness of 50 micrometers.

13. The aerosol-generating article according to claim 1, wherein the heat insulating layer is arranged surrounding the heat conductive layer.

14. The aerosol-generating article according to claim 1, wherein the aerosol-generating article has an asymmetric profile.

15. The aerosol-generating article according to claim 1, wherein the laminated wrapper further comprises multiple heat conductive layers overlapping each other in the axial direction of the aerosol-generating article.

16. The aerosol-generating article according to claim 1, wherein the heat conductive layer comprises one or more of holes, a ring shape, a helical shape, a helical shape with width changes, axial variations, and radial thickness changes.

17. The aerosol-generating article according to claim 1,
   further comprising a tubular filter section downstream of the aerosol-forming substrate,
   wherein the heat conductive layer is arranged at least partly wrapped around the tubular filter section.

* * * * *